United States Patent [19]

McDougald

[11] Patent Number: 5,401,405
[45] Date of Patent: Mar. 28, 1995

[54] COMBINED AIR/WATER BACKWASH IN A TRAVELLING BRIDGE FILTER

[75] Inventor: Mack D. McDougald, Ochlocknee, Ga.

[73] Assignee: Davis Water & Waste Industries, Inc., Thomasville, Ga.

[21] Appl. No.: 65,772

[22] Filed: May 24, 1993

[51] Int. Cl.$^6$ ............................................. B01D 24/14
[52] U.S. Cl. ................................. 210/273; 210/274; 210/275; 210/292
[58] Field of Search ............... 210/271, 273, 275, 279, 210/291, 293, 274, 292

[56] References Cited

U.S. PATENT DOCUMENTS

| | | | |
|---|---|---|---|
| 317,457 | 5/1885 | Hodgkin et al. | 210/274 |
| 607,155 | 7/1898 | Bleakly et al. | 210/279 |
| 647,780 | 4/1900 | Wilson | 210/279 |
| 668,127 | 2/1901 | Hodkinson | 210/271 |
| 722,581 | 3/1903 | Hodkinson | 210/271 |
| 1,604,379 | 5/1919 | Blaisdell | 210/271 |
| 2,559,784 | 7/1951 | Moore | 210/274 |
| 3,587,975 | 6/1971 | Moffett | 210/272 |
| 4,082,664 | 4/1978 | Lindstol | 210/277 |
| 4,118,322 | 10/1978 | San Roman | 210/274 |
| 4,152,265 | 5/1979 | Meyers | 210/292 |
| 4,211,656 | 7/1980 | Cochrane | 210/274 |
| 4,377,485 | 3/1983 | Krofta | 210/704 |
| 4,450,077 | 5/1984 | Black et al. | 210/275 |
| 4,450,487 | 5/1984 | Johnson et al. | 210/276 |
| 4,454,034 | 6/1984 | Astrom et al. | 210/108 |
| 4,624,783 | 11/1986 | Black et al. | 210/271 |
| 4,626,345 | 12/1986 | Krofta | 210/104 |
| 4,659,463 | 4/1987 | Chandler et al. | 210/264 |
| 4,859,330 | 8/1989 | Pauwels | 210/279 |
| 4,957,631 | 9/1990 | Pauwels | 210/264 |
| 4,988,439 | 1/1991 | Medders, II | 210/264 |
| 5,032,294 | 7/1991 | Schulz | 210/795 |
| 5,078,873 | 1/1992 | Black et al. | 210/264 |
| 5,167,840 | 12/1992 | Jaccarino | 210/274 |
| 5,232,585 | 8/1993 | Kanow | 210/274 |

OTHER PUBLICATIONS

"Water Quality and Treatment", American Water Works Association, 4th Edition, pp. 518–521.
"Wastewater Engineering: Treatment Disposal Re-use'", Metcalf & Eddy, Inc., 2nd. Edition, pp. 367, 368.

Primary Examiner—Cynthia L. Nessler
Attorney, Agent, or Firm—Nixon & Vanderhye

[57] ABSTRACT

In a travelling bridge filtration system including a tank divided into a plurality of adjacent filter cells, each of the cells containing filter media, a travelling bridge carriage located above the tank and movable along the tank, the carriage supporting a backwash hood engageable with each of the filter cells, the improvement comprising a liquid backwash pump for causing backwash liquid to flow through the cell in a first backwash direction counter to a second filtration direction, and for causing backwash air to be drawn into the cell and to flow in the first direction with the backwash liquid.

15 Claims, 4 Drawing Sheets

COMBINED AIR/WATER BACKWASH IN A TRAVELLING BRIDGE FILTER

FIELD OF THE INVENTION

This invention relates to a combined air/water (or other liquid) backwash arrangement in a travelling bridge filtration system.

BACKGROUND AND SUMMARY OF THE INVENTION

It is well known in the art to utilize gravity downflow filtration tanks divided into a plurality of filter cells, one adjacent the other, and all containing a multi-layer or single layer arrangement of granular filter media such as sand, gravel and the like. In typical downflow filtration systems of this type, water or other liquid containing suspended solid particles is introduced into the filtration tank from above, and clarified water is drawn off from a chamber either beneath or adjacent the individual filter cells. During downward flow through the individual cells, particulate matter is entrapped within the layer or layers of granular filter media, but eventually, the particulate matter clogs the filter media, thereby reducing the filtering capability of the system. Thus, there is a need for a periodic cleaning of the filter cells. It is also known to maintain such units in continuous operation during cleaning by the use of travelling bridge devices which move from one filter cell to the next, cleaning individual cells while permitting the filtration process to continue in the remaining cells.

Examples of travelling bridge apparatus of this type may be found in U.S. Pat. Nos. 5,089,117; 4,988,439; 4,957,631; 4,859,330; 4,764,288; 4,617,131; 4,540,487; 4,486,307; 4,133,766; 3,984,326; 2,235,227; and 2,302,449. Typically travelling bridge systems include an overhead carriage, movable along tracks, guideways or the like, which carry a backwash hood which is located over the open upper end of each filter cell, in either a continuous or step-wise manner. For a downflow type filter, water or other treatment liquid is caused to enter into the cell being backwashed (by a backwash pump) from below in a counterflow arrangement to the normal filtering direction. The backwash hood typically also includes a suction head (i.e., an additional pump) for drawing out fluid and debris forced to the surface of the filter cell as a result of the backwash. As the backwash of individual cells is completed, the travelling bridge moves the backwash hood over the next adjacent cell.

Combined air/water backwash systems are generally used in conjunction with single media, unstratified filter beds, and are usually employed to increase the effectiveness of water only backwash systems. These systems utilize a backwash pump in combination with an auxiliary air supply such as a blower or compressor. Examples of a combined air/water backwash in a travelling bridge filter may be found in U.S. Pat. Nos. 5,078,873; 5,032,294; 4,624,783 and commonly owned U.S. Pat. No. 4,859,330.

This invention relates to an improved air/water (or other liquid) backwash system which incorporates a self-aspirating venturi which expels entrained air or gas through the backwash water discharge pipe, and which utilizes the suction ability of the backwash pump to pull in air for air scour without the use of an auxiliary air supply such as a blower or air compressor. In addition, an automatic actuator on the air supply inlet line allows the filter bed to be pulsed for additional agitation.

In the exemplary embodiment, the overall configuration of the tank, filter bed, individual cell construction and travelling bridge carriage may be in accordance with conventional practice, with exceptions noted. The tank itself is of concrete or steel construction and of generally rectangular shape, defined by a bottom wall, a pair of side walls and a pair of end walls. In an exemplary embodiment, the tank is divided into a plurality of filter cells by a plurality of vertical, transversely extending partitions which extend from one side of the tank to the other in a substantially parallel arrangement. These partitions do not extend to the bottom wall of the tank but, rather, to a horizontal, porous subfloor or underdrain vertically spaced from the bottom wall. Thus, the partitions themselves are fixed to and supported by the side walls of the tank, and, in turn, the partitions support the underdrain. The filter bed media is supported directly on the underdrain so that filtrate from each filer cell drains to a common clearwell below the underdrain and extending substantially the full length and width of the tank. The filtrate is discharged through an effluent outlet at one end of the tank. In alternative arrangements, the filtrate drains through discharge openings in the tank side wall (one opening in each cell) and into a clearwell running the length of the tank.

A trough (divided into separate influent and backwash troughs) extends along an interior surface of one side wall of the tank, adjacent the upper, open end thereof. Influent is uniformly distributed to all of the cells from the influent trough, while backwash or other treatment liquid is carried out of the tank via the backwash trough.

The travelling bridge assembly includes a carriage movable along tracks secured to upper edges of the tank side walls. The carriage supports a backwash hood and associated backwash pump which, in the exemplary embodiment, are suspended from the carriage. The hood itself has length and width dimensions substantially corresponding to individual cell dimensions. The hood may also reciprocate vertically, thereby enabling the hood to sealingly engage each cell, in succession, as the carriage is indexed along the length of the tank.

The backwash hood encloses a backwash header connected to the backwash pump to thereby draw filtrate back up through the cell and into the hood and ultimately to a backwash discharge pipe. The hood also encloses an air inlet pipe for introducing air into the bottom of the cell, as well as air collection chambers for collecting air after it has risen through the cell and entered the hood. A series of air/media separation baffles mounted in the hood serve to separate the air from the backwash water stream, and to separate the filter media which may be carried up into the backwash hood by the violent action of the air scour, from the backwash water stream. As a result, air binding of the pump is prevented and filter media is precluded from being pumped out of the system.

The air collection chambers join with an air discharge pipe which terminates at a backwash liquid venturi in the backwash water discharge pipe, so that the collected air is entrained and discharged with the backwash liquid. The suction created at the venturi is sufficient by itself to pull air into the air inlet pipe (as controlled by the manual and/or automatic damper) without the aid of a compressor blower, as described in greater detail below.

More specifically, air is diverted to air collection chambers on the sides of the backwash hood. Filter media which is carried up into the air/media separation zone settles on the upper surface of the inclined baffles and then falls back into the filter cell area by gravity due to the slope of the inclined baffles. Due to specific gravity and hydraulic design of the backwash hood, only suspended particulate matter which has been removed from the filter bed during backwash and air scour makes its way into the backwash header where it is subsequently expelled from the system by the backwash pump.

To remove the air from the air collection chambers, the chambers are piped to the low pressure port of the venturi type differential pressure ejector located in the backwash pump discharge pipe. This ejector operates under the Bernoulli Principal. Air is drawn into the ejector and is subsequently expelled from the system via an air vent in the backwash water stream.

Each filter cell in this exemplary embodiment is equipped with an air scour manifold which serves to distribute air over the entire area of the filter cell near the bottom of the cell but slightly above the underdrain. The manifold has a central riser pipe which is equipped with a flanged, air scour check valve. A mating gasketed flange is located on the air inlet pipe inside the hood so that when the backwash hood lowers to seal to a pair of cell partitions defining an individual cell, the gasketed flange mates and seals to the air scour check valve. The air supply or inlet pipe inside the hood extends upwardly out of the hood, above the maximum water level in the tank. The air inlet pipe is provided with a manual damper for air volume control, and an automatic damper for cyclic control during backwash.

With the automatic air damper, the system may be operated as 1) a hydraulic only backwash; 2) a pulsed air scour, by cycling the damper to open and closer periodically during backwash; or 3) as a continuous air scour, simultaneous with the backwash. When the system is operated with air scour, the damper is programmed to close prior to de-energizing the backwash pump so that entrained air can be expelled before returning the system to the dosing mode. Entrained air, if not expelled from the filter media, will air bind the filter bed, inhibiting the dosing mode.

The above generally described travelling bridge filtration system operates in a dosing, i.e., filtration mode and in a backwash mode. The dosing or filtration mode is substantially the same as any conventional gravity (i.e., downflow) filtration device. The backwash mode is initiated by head loss or by timer and, when so initiated, the bridge travels to the first cell and stops. The backwash hood lowers and seals to the cell. After a short pause, the backwash pump energizes and begins to draw filtrate up through the underdrain, through the filter media, into the backwash hood where it is collected by the backwash header which is coupled to the backwash pump. Backwash flow is discharged by the backwash pump past a venturi then through a back pressure rate control valve and then into the backwash waste trough.

The underdrain system is designed to induce sufficient hydraulic headloss at the design backwash rate to insure uniform hydraulic flow. At this design headloss, the filter cell operates under negative pressure during backwash. As backwash liquid flows past the venturi located on the backwash discharge pipe, air is drawn down through the air scour riser pipe, into the air scour manifold distribution system and into the filter cell where it rises through the filter media concurrently with the backwash water thereby providing a very violent agitation of the filter media. The backwash air is entrained with the backwash liquid at the venturi (downstream of the backwash pump) and both air and backwash liquid are discharged together.

The backwash pump discharge line is equipped with a rate control valve to set operating conditions. This valve is located downstream of the venturi. As noted above, an air vent is located in the discharge line downstream of the rate control valve to release the entrained air, which would otherwise cause surging at the backwash water discharge point.

Thus, in accordance with the broader aspects of one exemplary embodiment of the invention, there is provided a travelling bridge filtration system including at least one filter cell adapted to be periodically backwashed, a combined air/water backwash apparatus comprising backwash liquid pump means for effecting the introduction and removal of backwash air and liquid into and out of the cell in a direction counter a normal filtering direction.

The invention also relates to a method of backwashing a filter cell with both air and liquid broadly comprising the steps of:

a. locating a backwash hood over the filter cell;
b. activating a backwash liquid pump to draw backwash liquid up through the filter cell in a direction counter to a normal filtration flow direction and into the backwash hood; and
c. simultaneously with step (b), drawing air up through the filter cell with the backwash liquid, using suction created by the backwash liquid pump.

Other more specific aspects of the process steps used to carry out the combined liquid/air backwash will become apparent from the detailed description further herein.

The above described combined air-water backwash system has applicability to:

a. waste water denitrification;
b. secondary waste water filtration;
c. potable water filtration;
d. industrial process water filtration; and
e. industrial waste water filtration.

Additional objects and advantages of the invention will become apparent from the detailed description which follows.

DETAILED DESCRIPTION OF THE DRAWINGS

Figure 1:
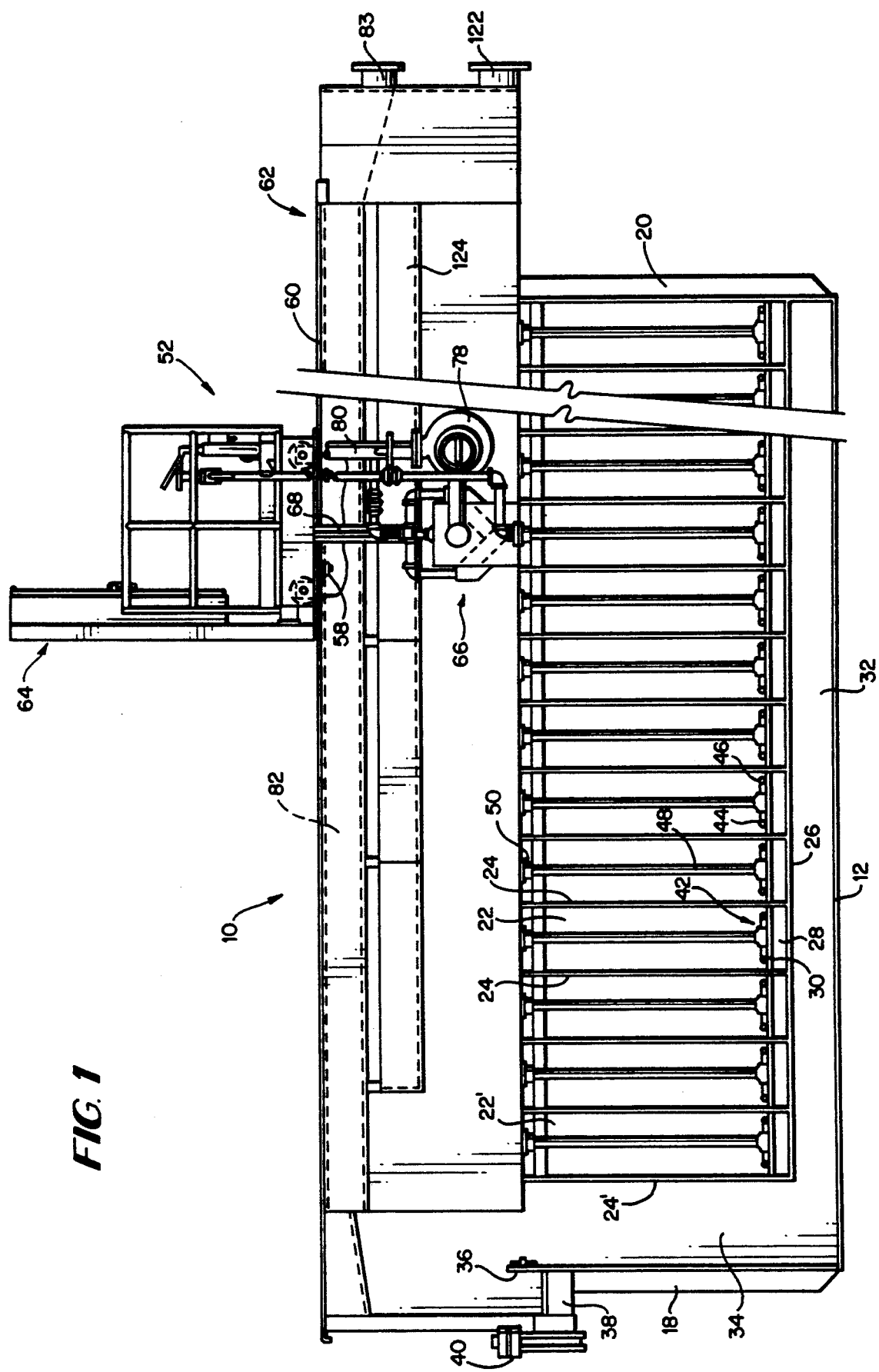
FIG. 1 is a side elevation, partly in section, of a travelling bridge filter system in accordance with the invention.
Figure 2:
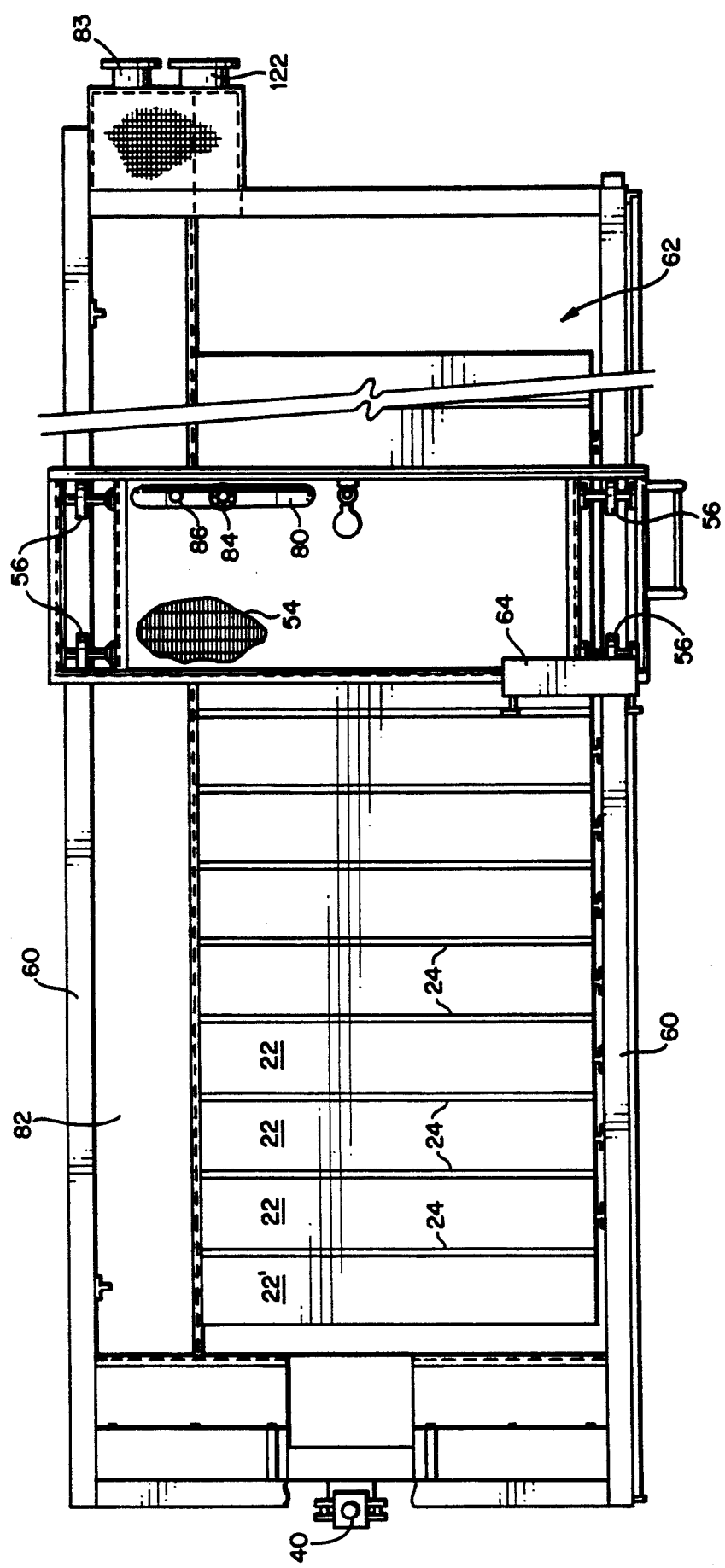
FIG. 2 is a plan view of the system illustrated in FIG. 1, with components removed for clarity.
Figure 3:
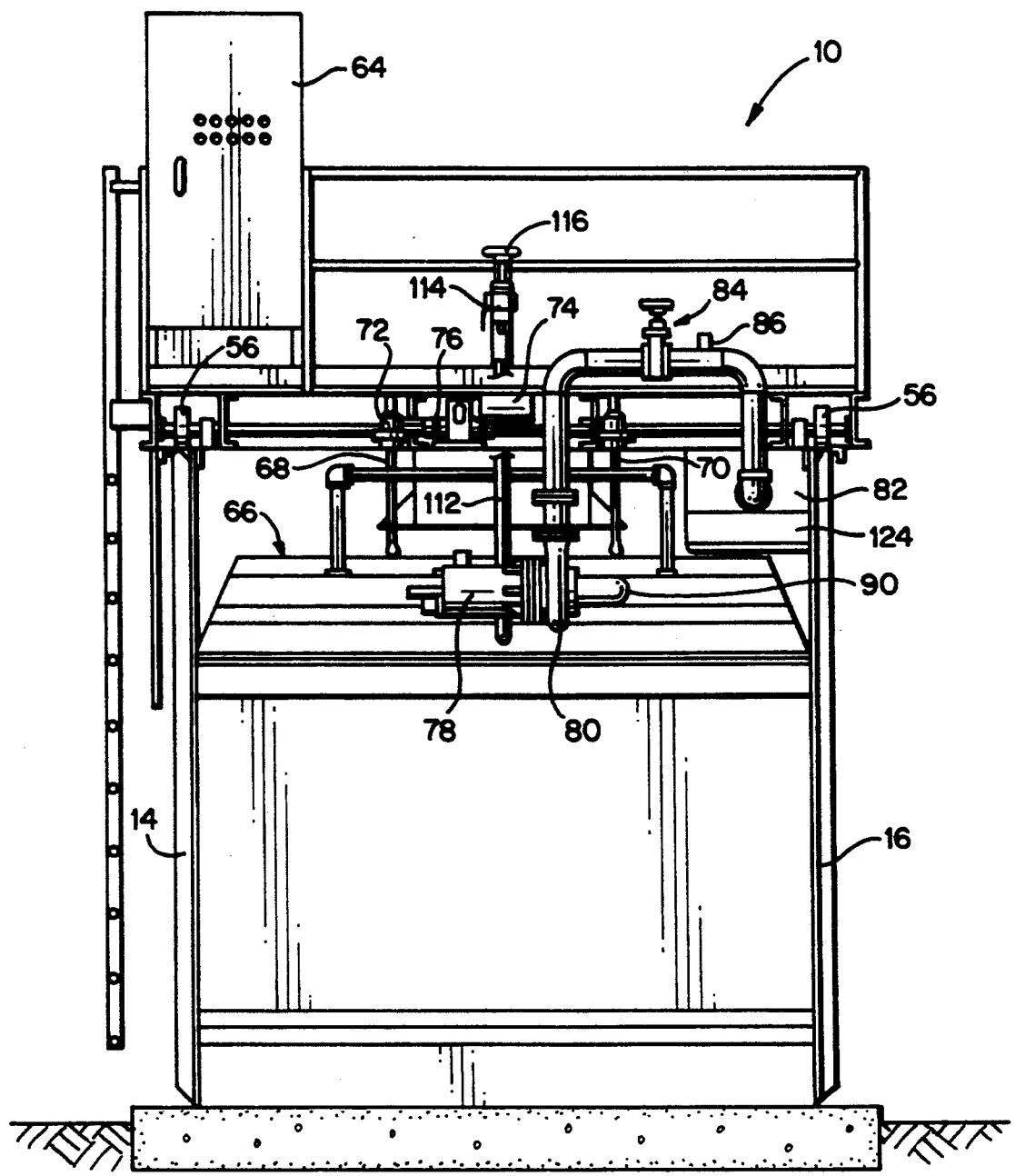
FIG. 3 is an end view of the system shown in FIG. 1.

With reference now to FIGS. 1–3, the travelling bridge filtration unit 10 includes a tank of concrete or steel construction which includes a bottom wall 12, a pair of side walls 14, 16 and a pair of end walls 18, 20. The tank is divided into a plurality of individual filter cells 22 by a plurality of vertically arranged, substantially parallel partitions 24 which extend between a subfloor or underdrain 26 and the upper, open end of the tank 10. The partitions 24 are secured at opposite ends to the side walls 14, 16 of the tank.

The underdrain 26 comprises a plurality of perforated plates which are supported by and between the vertical partitions 24 by any suitable arrangement (e.g., support shelves extending along lower ends of the partitions). In place of perforated plate underdrains, conventional fused porous polyethylene or porous alumina oxide plates may also be employed.

The composition and depth of filter media supported on the underdrain within the individual filter cells will depend on the specific application. FIG. 1 illustrates a bed comprised of a base layer 28 of $\frac{1}{4}''-\frac{1}{2}''$ gravel and an upper layer 30 of $\frac{1}{8}''-\frac{1}{4}''$ gravel. For denitrification applications, a deep bed (about 5', with the surface of the bed just below the flange 50) of 2-3 mm of denitrification media may be employed.

As best seen in FIG. 1, the underdrain 26 is vertically spaced above the bottom wall 12 to create a clearwell 32 having a height of about 12". Since the partitions 24 extend only to the underdrain 26, it will be appreciated that the clearwell 32 is common to all of the cells 22. At the left side of the tank as viewed in FIG. 1, the individual cells 22 are terminated at a last partition 24', leaving a chamber 34 from which filtrate or effluent from clearwell 32 can spill over an effluent weir 36 for discharge through a effluent outlet 38, under the control of valve 40.

Each cell 22 is provided with an air scour manifold 42 including lateral distribution pipes 44, 46 extending substantially the full width of the cell 22, and provided with apertures for uniformly distributing air over the entire area of the cell, near but slightly above the underdrain 26. The manifold also includes a central riser pipe 48 equipped with a flanged check valve 50 designed for mating and sealing engagement with an air supply pipe within the backwash hood as described below.

The travelling bridge 52 includes horizontal decking 54 (bar grating, for example, as shown in FIG. 2) supported by main wheels 56 and guide wheels 58 (see FIG. 1) which ride on tracks 60, 62 extending along opposite upper edges of the tank side walls 14, 16. The travelling bridge 52 is, in effect, a carriage movable over substantially the entire length of the tank, from an initial rest area 62 (on the right hand side in FIGS. 1 and 2) which is laterally offset from the plurality of filter cells 22, to the last cell 22' adjacent the clearwell chamber 34. The travelling bridge 52 supports a control panel 64 and a backwash hood 66, the latter suspended beneath the bridge 52 via rods 68, 70 and an associated motor driven, mechanical actuator 72 which lowers and raises the hood 66 relative to the filter cells. The bridge 52 is selectively driven in two opposite directions along the tracks by means of a $\frac{1}{4}$ HP drive motor 74 with an associated brake and a worm gear speed reducer 76 connected to the drive wheels 56.

The bridge 52 also supports a submersible backwash pump 78 adjacent the hood 66, the pump having a backwash discharge pipe 80 which extends upwardly to the bridge, horizontally along the hood as best seen in FIG. 3, and then downwardly to a backwash discharge trough 82 located along the inside of the side wall 14, and adjacent the upper end thereof. Backwash effluent is carried away via outlet 83. The horizontal portion of the pipe 80 is provided with a backwash rate control valve 84 and an air vent 86.

Tracks 60, 62 are provided with a plurality of limit switch actuators 88 which controls bridge travel between the last cell 22 and at the rest area 62.

Figure 4:
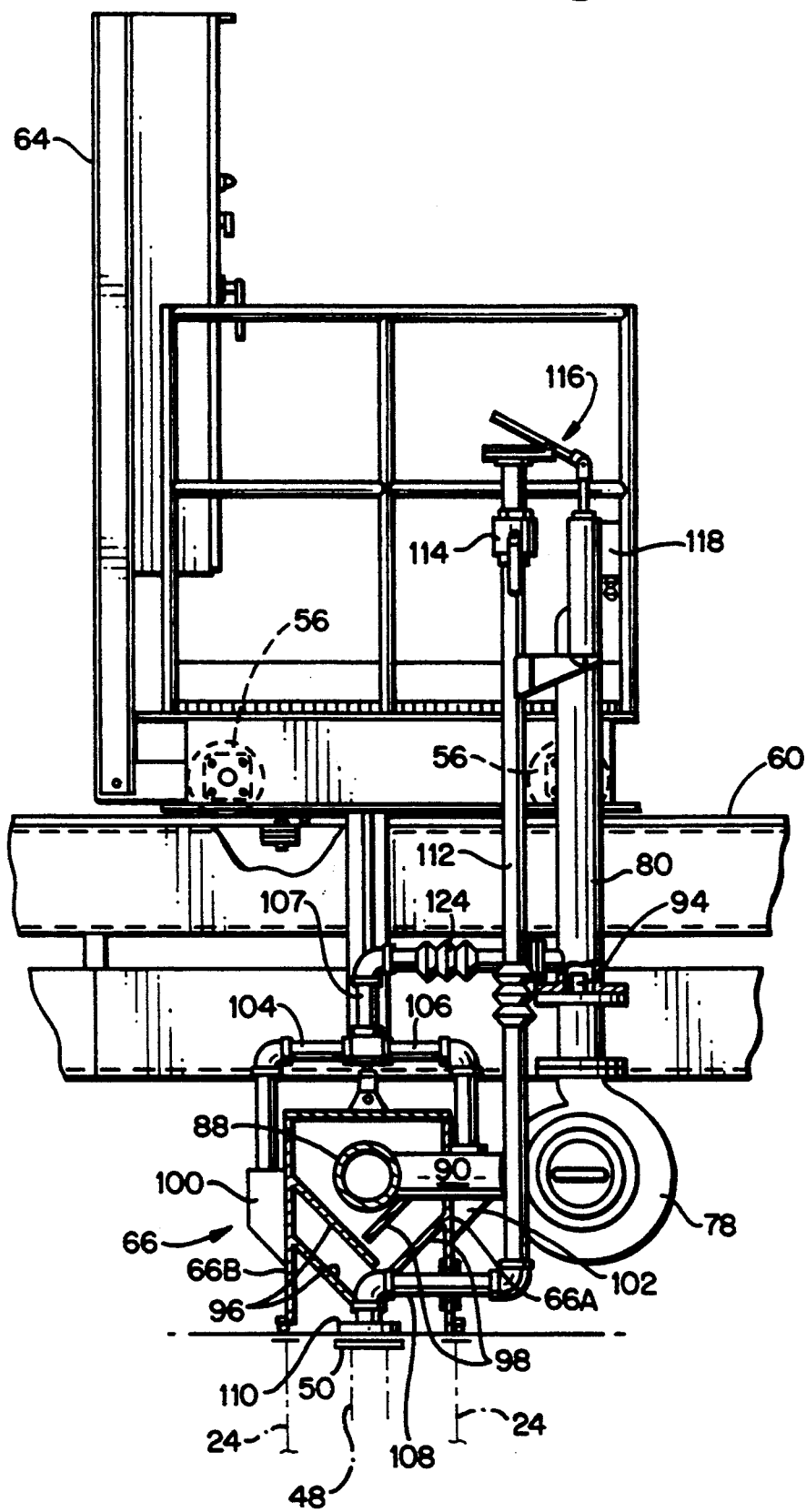
FIG. 4 is an enlarged detail of the backwash hood apparatus, taken from FIG. 1.

With reference now especially to FIG. 4, the backwash hood 66 encloses a horizontally arranged backwash header 88 located which extends substantially the entire length of the hood 66 (and hence, each cell 22). The header 88 is coupled to the backwash pump 78 via pipe 90 which extends through the hood sidewall 66A. A flexible coupling at the interface of the pipe 90 and hood 66 facilitates vertical up and down movement of the hood 66 relative to the pump. The header 88 is provided with a plurality of apertures (not shown) so that backwash sucked into the hood 66 will be drawn into the header 88 and removed from the hood 66 via pipe 90, pump 78 and discharge pipe 80.

The backwash discharge pipe 80 is also equipped with a venturi type differential pressure ejector 94 (see FIG. 4), the purpose of which will be described in greater detail below. The backwash hood 66 is also fitted with a series of air/media separation baffles 96, 98, which are arranged so as to slant downwardly and inwardly from each side wall 66A and 66B of the hood 66. Air collection chambers 100 and 102 are formed on either side of the hood, as best seen in FIG. 4. Air draw off pipes 104 and 106 extend from chambers 100 and 102, respectively, and serve to guide the collected air to the pipe 80, just above the venturi 94, by means of pipe 107.

The backwash hood 66 also includes a pipe 108 for introducing air into each filter cell 22. The pipe 108 presents a vertical face and gasketed flange 110 for sealing engagement with the flanged check valves 50 of the riser pipes 48 in each cell 22. The pipe 108 exits the hood side wall 66A and is connected to a vertically oriented air supply line 112 equipped with a manual damper 114 for air volume control and an automatic damper 116 for cyclic control during backwash. The latter employs a programmable actuator 118.

The lower peripheral edge of the hood 66 is fitted with a sealing strip 120 which sealingly engages adjacent partitions 24 defining a cell 22 during backwash.

In use, influent is admitted to the unit 10 by means of inlet 122 and associated influent trough 124, located below the backwash effluent trough 82. The influent is spread uniformly over the filter cells 22 and flows downwardly through the filter bed media to the clearwell 32. The filtration or dosing aspects of this unit are entirely conventional and need not be described further.

When backwash is initiated by head loss or by timer, the bridge 52 travels to the first of the cells 22 and stops. The backwash hood 66 lowers and seals to the cell 22 via sealing strip 120, facilitated by flexible couplings C at the interface of pipe 90 and hood 66, in the pipe 107, and in the air supply pipe 112.

After a short pause, the backwash pump 78 energizes and begins to draw filtrate up through the underdrain 26, through the filter media 28, 30, into the backwash hood 66 where it is collected by the backwash header 88. The backwash liquid flows into the discharge pipe 80, through the venturi 94, through the back pressure rate control valve 84, and then into the backwash waste trough 82.

During backwash, the pressure in the cell 22 being backwashed is reduced, and becomes negative when the backwash pump is activated. The underdrain system is designed to induce sufficient head loss at the design backwash rate to ensure uniform hydraulic flow. Since the cell 22 is operating under negative pressure and the air scour system is open to atmosphere, air can be drawn down through the air scour pipe 112, and introduced into the air scour manifold distribution system 44, 46 by means of risers 48. The air then rises through the filter media concurrently with the backwash water, thereby providing a very violent agitation of the filter media.

Air rising from the filter media is diverted to the air collection chambers 102, 104 on the sides of the backwash hood 66. At the same time, filter media which is carried up into the air media separation zone settles on the upper surface of the inclined baffles 96, 98 and then falls back into the filter cell 22 area by gravity due to the slope of the incline of the baffles.

Due to specific gravity and hydraulic design of the backwash hood, only suspended particulate matter which has been removed from the filter bed during backwash and air scour makes its way into the backwash header where it is subsequently expelled from the system by the backwash pump 78. Air collected within the air chambers 102, 104 is piped to the lower pressure port of the venturi type differential pressure ejector 94 located in the backwash pump discharge line 112. This ejector operates under the Bernoulli principle, and as air is drawn into the pipe 112, it is subsequently expelled from the system with the backwash water stream.

With the automatic damper 16 associated with the air scour line, the system may be operated as a hydraulic only backwash, if desired. Alternatively, a pulse air scour may be achieved simply by cycling the damper 16 to open and close periodically during backwash. The system may also be used as a continuous air scour with simultaneous liquid backwash. When the system is operated with air scour, the damper is programmed to close prior to de-energizing the backwash pump so that entrained air can be expelled before returning the system to the dosing mode. Entrained air, if not expelled from the filter media, will air bind the filter bed inhibiting the dosing mode. In order to prevent air carry over from air binding the pump and to prevent filter media from being pumped out during backwash and air scour, the inclined air/media separation baffles 96, 98 separate the air from the backwash water stream and separate the filter media which may be carried up into the backwash hood by the violent action of the air scour, from the backwash water stream.

Various changes to the system are consistent with and are contemplated before the invention. For example, the underdrain system including individual filter cell plenums with side effluent discharge can be used, as disclosed in co-pending, commonly owned application Ser. No. 08/068,165, entitled "Travelling Bridge Filter System And Associated Underdrain" incorporated herein by reference. Alternately, if it is desirable to purge the filter bed with a gas such as oxygen and nitrogen, the gas supply may be piped to the air scour piping inlet for introduction into the filter bed. Should gas recovery from the filter bed also be desirable, a gas recovery system may be installed in the backwash discharge piping.

In addition, in lieu of venturi type differential pressure ejector 94, a vacuum pump piped to the air collection chambers 102, 104 could also be employed.

Moreover, while a single submersible pump disclosed to effect backwash, it will be appreciated that a self-priming pump mounted on the bridge could be utilized.

It is also possible to utilize a two-pump system to effect backwash, with one pump on either side of the filter cell, i.e., with one pump in the clearwell 32 and another fixed to the hood 66 or bridge 52. In any of the above alternative pump arrangements, the need for an auxiliary air pump or blower is eliminated.

It should further be understood that the system as described here and above may also be operated as a denitrification filter. When so operated with the above described deeper filter bed, a by-product of the process is the formation of nitrogen gas due to bacterial conversion of nitrate to nitrogen gas. As nitrogen gas builds up in the filter bed, the filter bed becomes gas bound which causes hydraulic head loss to increase eventually requiring backwash initiation to clear the gas blockage. The combined air/water backwash system of this invention can be utilized for denitrification due to its ability to separate the air/water stream. When the filter bed becomes gas bound, the backwash system can be initiated with automatic damper in the closed position. Under this mode of operation, the nitrogen gas bubbles will be expelled by the rising backwash water.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a travelling bridge filtration system for an open top tank including at least one filter cell having filter media therein to be periodically backwashed, and including a travelling bridge carriage movable along the open top of the tank; a backwash hood suspended from said carriage and engageable with said at least one filter cell; the improvement comprising a combined air/liquid backwash apparatus comprising backwash liquid pump means for effecting the introduction and removal of both air and water into and out of the cell in a direction counter to a normal filtering direction, said backwash hood enclosing a backwash air supply pipe, at least one backwash air collection chamber and a backwash liquid collection header, and further wherein means are provided within said hood for separating collected backwash air and collected backwash liquid.

2. The system of claim 1 wherein said pump means comprises a single submersible pump mounted to a backwash hood sealingly engageable with an open, upper end of said at least one filter cell.

3. The system of claim 1 including separate liquid and air supply pipes extending from said backwash hood into said at least one cell; and a common discharge pipe for removal of backwash air and backwash liquid collected in said backwash hood.

4. The system of claim 3 wherein said air supply pipe is provided with an automatic air damper.

5. The system of claim 3 wherein said air supply pipe is provided with a manual air damper.

6. The system of claim 3 wherein said common discharge pipe contains a backwash air inlet for receiving backwash air from said backwash hood and a backwash liquid venturi adjacent said backwash air inlet.

7. The system of claim 6 wherein said common discharge pipe is provided with an air vent downstream of said venturi and said backwash air inlet.

8. In a travelling bridge filtration system including a tank divided into a plurality of adjacent filter cells, each of said cells containing filter media, a travelling bridge carriage located above the tank and movable along the tank, said carriage supporting a backwash hood engageable with each of said filter cells, the improvement comprising liquid backwash pump means and associated conduit means for causing backwash liquid to flow from below the cell upwardly through the cell to the backwash hood in a first backwash direction counter to a second filtration direction, and for simultaneously causing backwash air to be drawn into the cell and to flow from a lower portion of the cell upwardly to the backwash hood in said first direction with said backwash liquid.

9. The travelling bridge filtration system of claim 8 and including an air inlet pipe with a connecting flange located within the hood; each cell having an air supply header connected to said connecting flange of said air inlet pipe.

10. The travelling bridge filtration system of claim 8 wherein said liquid backwash pump comprises a submersible pump.

11. In a travelling bridge filtration system including a tank divided into a plurality of adjacent filter cells, each of said cells containing filter media, a travelling bridge carriage located above the tank and movable along the tank, said carriage supporting a backwash hood engageable with each of said filter cells, the improvement comprising liquid backwash pump means and associated conduit means for causing backwash liquid to flow from below the cell upwardly through the cell to the backwash hood in a first backwash direction counter to a second filtration direction, and for simultaneously causing backwash air to be drawn into the cell and to flow from a lower portion of the cell upwardly to the backwash hood in said first direction with said backwash liquid, and wherein said liquid backwash pump means is located downstream of said hood, and wherein first means are provided for separating backwash liquid and backwash air in said hood, and second means are provided for joining backwash air and backwash liquid downstream of said liquid backwash pump.

12. The travelling bridge filtration system of claim 11 wherein said first means comprises a plurality of inclined baffles within said hood.

13. The travelling bridge filtration system of claim 11 wherein said second means includes a backwash liquid discharge pipe with a venturi therein, and a collected air inlet to said discharge pipe immediately downstream of said venturi.

14. The travelling bridge filtration system of claim 13 wherein said second means further comprises at least one air collection chamber in communication with said hood at one end, and with said collected air inlet at an opposite end.

15. In a travelling bridge filtration system for an open top tank including at least one filter cell having filter media therein to be periodically backwashed, and including a travelling bridge carriage movable along the open top of the tank; a backwash hood suspended from said carriage and engageable with said at least one filter cell; the improvement comprising a combined air/liquid backwash apparatus wherein said backwash hood encloses a backwash air supply pipe, at least one backwash air collection chamber and a backwash liquid collection header; a backwash pump in fluid communication with said backwash hood; a separate liquid and air supply pipes extending from said backwash hood into said at least one cell, and separate liquid and air discharge pipes extending out of said backwash hood and joining to a common discharge pipe downstream of said backwash pump.

* * * * *